United States Patent
Oh et al.

(10) Patent No.: US 6,255,417 B1
(45) Date of Patent: *Jul. 3, 2001

(54) PROCESS FOR THE PREPARATION OF OLEFINIC POLYMERS USING METALLOCENE CATALYST

(75) Inventors: Jae-Seung Oh; Tai-Ho Park; Bun-Yeoul Lee; Sang-Won Jeong, all of Daejeon (KR)

(73) Assignee: LG Chemical Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/077,278
(22) PCT Filed: Nov. 28, 1996
(86) PCT No.: PCT/KR96/00218
§ 371 Date: May 27, 1998
§ 102(e) Date: May 27, 1998
(87) PCT Pub. No.: WO97/19960
PCT Pub. Date: Jun. 5, 1997

(30) Foreign Application Priority Data

Nov. 28, 1995 (KR) .................................................. 95-44344

(51) Int. Cl.[7] .................................... C08F 2/06; C08F 4/64
(52) U.S. Cl. ............................ 526/160; 526/126; 526/127; 526/943
(58) Field of Search .................................... 526/126, 160, 526/943

(56) References Cited

U.S. PATENT DOCUMENTS

| | | | | |
|---|---|---|---|---|
| 5,132,262 | * | 7/1992 | Rieger et al. | 502/117 |
| 5,385,877 | * | 1/1995 | Fujita et al. | 502/103 |
| 5,416,178 | * | 5/1995 | Winter et al. | 526/160 |
| 5,416,228 | * | 5/1995 | Ewen et al. | 556/7 |

FOREIGN PATENT DOCUMENTS 5-339315 * 12/1993 (JP).

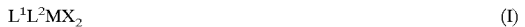

*Primary Examiner*—David W. Wu
*Assistant Examiner*—R. Rabago
(74) *Attorney, Agent, or Firm*—Anderson Kill & Olick, PC

(57) ABSTRACT

An improved process of preparing a olefinic polymer of the type in which an olefinic monomer is polymerized alone or with a comonomer in a hydrocarbon solvent using a metallocene catalyst of formula (I) in the presence of a cocatalyst; wherein the improvement comprises: preparing the olefinic polymer in an aliphatic hydrocarbon solvent using a modified metallocene catalyst which is obtained by introducing at least one $C_{5-20}$ alkyl substituent into the π-ligand, the alkylene bridge or silicon bridge of the metallocene catalyst of formula (I):

$$L^1L^2MX_2 \qquad (I)$$

wherein,
M is Ti, Zr or Hf;
X is a halogen, or a $C_{1-3}$ alkyl group; and
$L^1$ and $L^2$ are each a π-ligand selected from the group consisting of cyclopentadienyl, indenyl, fluorenyl and derivatives thereof, and are optionally linked together by a $C_{1-4}$ alkylene bridge optionally substituted with a $C_{1-3}$ hydrocarbyl group or by a silicon bridge optionally substituted with a $C_{1-3}$ hydrocarbyl group.

3 Claims, No Drawings

PROCESS FOR THE PREPARATION OF OLEFINIC POLYMERS USING METALLOCENE CATALYST

FIELD OF THE INVENTION

The present invention relates to an improved method for preparing an olefinic polymers by polymerizing an olefinic monomer in an aliphatic hydrocarbon solvent using a metallocene catalyst in the presence of a cocatalyst.

DESCRIPTION OF THE PRIOR ART

A metallocene compound refers to a transition metal complex having coordinated cyclopentadienyl ligands. Many studies on various catalysts based on metallocene compounds have been carried out since Kaminsky and Sinn reported that a metallocene compound, when used together with a condensation product of water and methylaluminum (e.g., methylaluminoxane, MAO), exhibits a high catalytic activity in olefin polymerization [H. Sinn and W. Kaminsky, Adv. Organomet. Chem., 18, 99 (1980); and H. Sinn, W. Kaminsky, H. J. Vollmer and R. Woldt, Angew. Chem., 92, 396 (1980)]. Such studies have shown that may metallocene catalysts exhibit high activities in polymerizing olefins, diolefins, styrenes, and others (see WO 91/14713).

When a metallocene catalyst is used in olefin polymerization, the structure and properties of the polymer produced can be better controlled than when a conventional Ziegler-Natta catalyst is used together with an alkylaluminum compound as a cocatalyst. For example, the molecular weight distribution of the polymer becomes narrower, and when used in a copolymerization, the distribution of the comonomer in the copolymer is much more uniform.

However, one drawback of metallocene catalysts is that although they readily dissolve in aromatic hydrocarbons such as benzene, toluene and substituted benzene, they are almost insoluble in aliphatic hydrocarbons. Bisindenyl zirconium dimethyl, for example, is completely soluble in toluene whereas it does not dissolve in heptane and this difference in solubility is reflected on its catalytic activity, i.e., its catalytic activity in toluene is greater than that in heptane by a factor of 7 or more (see J. Polym. Sci; Polym. Chem. Ed., 123, 2117 (1985)). Because the use of an aromatic hydrocarbon solvent in a polymerization process is not advantageous due to its toxicity and unfavorable process economics in recovering a high-boiling aromatic solvent, it is desirable to develop an efficient polyolefin manufacture process using a metallocene catalyst in an aliphatic hydrocarbon solvent. Accordingly, there exists a need to develop a new metallocene catalyst that exhibits a high activity in an aliphatic hydrocarbon solvent.

Karol et al. have reported on the effects of introducing such substituents as methyl, n-butyl and t-butyl to the cyclopentadienyl ligands of biscyclopentadienyl zirconium dichloride on the rate of copolymerization of ethylene and 1-hexene in hexane[Karol et al., "Catalyst Design for Tailor made Polyolefins", Studies in Surface Science and Catalysis, B. Delmon and J. T. Yates Ed., Vol. 89, p. 389 (1994)]. However, the results were inconclusive in terms of the above mentioned purpose, and there still remained the need to develop a more effective method for the preparation of polyolefins.

SUMMARY OF THE INVENTION

Accordingly, it is an object of the present invention to provide an improved method for the preparation of an olefinic polymer in an aliphatic hydrocarbon solvent by way of using a modified metallocene catalyst having at least one $C_{5-20}$ alkyl substituent so as to increase its solubility in the aliphatic hydrocarbon solvent, thereby increasing the activity of the catalyst.

In accordance with the present invention, there is provided an improved process of preparing an olefinic polymer of the type in which an olefinic monomer is polymerized alone or with a comonomer in a hydrocarbon solvent using a metallocene catalyst of formula(I) in the presence of a cocatalyst; wherein the improvement comprises: preparing the olefinic polymer in an aliphatic hydrocarbon solvent using a modified metallocene catalyst which is obtained by introducing at least one $C_{5-20}$ alkyl substituent into the π-ligand, the alkylene bridge or silicon bridge of the metallocene catalyst of formula (I):

$$L^1 L^2 MX_2 \qquad (I)$$

wherein,

M is Ti, Zr or Hf;

X is a halogen, or a $C_{1-3}$ alkyl group; and $L^1$ and $L^2$ are each a π-ligand selected from the group consisting of cyclopentadienyl, indenyl, fluorenyl and derivatives thereof, and are optionally linked together by a $C_{1-4}$ alkylene bridge optionally substituted with a $C_{1-3}$ hydrocarbyl group or by a silicone bridge optionally substituted with a $C_{1-3}$ hydrocarbyl group.

DETAILED DESCRIPTION OF THE INVENTION

The catalyst that may be used in practicing the present invention is a metallocene compound having one or more $C_{5-20}$ alkyl substituents in the ligand moiety and the bridge between ligands. Examples of particularly preferred catalysts of the present invention are the compounds of formula (II) to (X):

(II)

(III)

(IV)

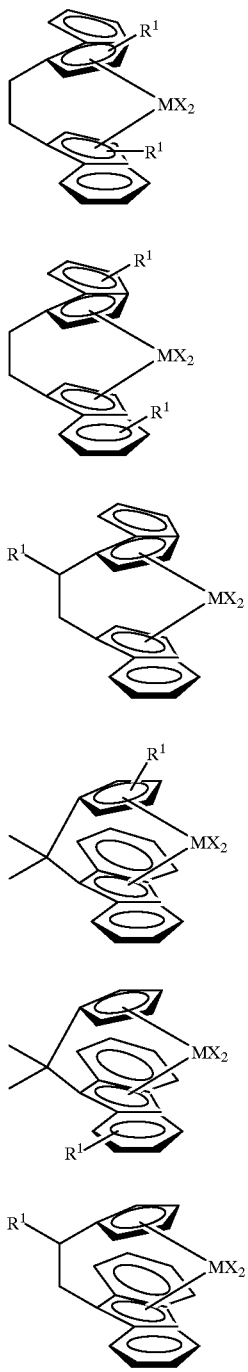

(V)

(VI)

(VII)

(VIII)

(IX)

(X)

wherein $R^1$ is a $C_{5-20}$ alkyl group.

The introduction of long chain hydrocarbon substituents imparts many desirable properties to the metallocene catalyst, e.g., improved solubilities and high polymerization activities in aliphatic hydrocarbon solvent, and easier activation due to improved interactions with cocatalysts.

As the cocatalyst, alkylaluminoxane of formula (XI) and/or alkyl metal compound of formula (XII) may be used:

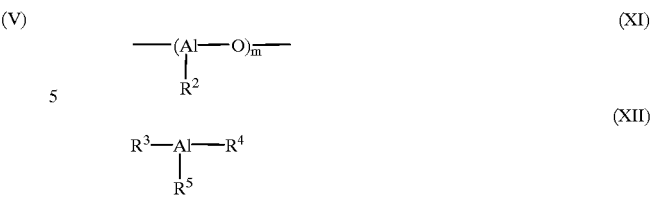

(XI)

(XII)

wherein:
m is an integer of 2 or more; and
$R^2$, $R^3$, $R^4$ and $R^5$, are each $C_{1-20}$ hydrocarbyl group or a halogen.

Representative examples of an alkylaluminoxane of formula (XI) which may be used in the present invention include: methylaluminoxane, ethylaluminoxane, propylaluminoxane, butylaluminoxane, i-butylaluminoxane and the like.

Representative examples of an alkyl metal compound of formula (XII) which may be used in the present invention include: trimethylaluminum, triethylalminum, tripropylaluminum, triisopropylaluminum, tributylaluminum, triisobutylaluminum, triisoprenylaluminum and the like.

The olefinic monomer which can be used in the present invention includes ethylene, α-olefin, cyclic olefin, dienes, trienes and the like. The preferred are ethylene, propylene, 1-butene, 1-pentene, 4-methyl-1-pentene, 1-hexene, 1-heptene, 1-octene, 1-nonene, 1-decene, cyclopentene, 1,3-cyclopentadiene, norbonene, norbonadinene, ethyliden norbonene, vinyl norbonene, dicyclopentadiene, 1,3-butadiene, 1,4-pentadiene, 1,4-hexadiene, 1,5-hexadiene, styrene, α-methylstyrene, divinylbenzene, 3-chloromethylstyrene and the like. The monomer can also be copolymerized with one or more other monomers.

The preferred solvent which may be used in the present invention includes a $C_{3-10}$ aliphatic hydrocarbon solvent, for example, propane, butane, isobutane, pentane, hexane, heptane, octane, nonane, decane and a mixture thereof. It is also possible to use one of the olefinic monomers mentioned above as the solvent in practicing the present invention.

The catalyst which may be used in practicing the present invention is a metallocene compound obtained by introducing at least one $C_{5-20}$ alkyl substituent to the compound of formula (I) and it may be prepared by employing a conventional method, e.g., by a process which comprises: dissolving a metal salt (e.g., Na, K etc) of a $C_{5-13}$ ring compound containing a cyclopentadienyl moiety; adding a $C_{5-20}$ alkyl derivatives, e.g., a halide thereto to conduct a substitution reaction. The cyclopentadiene moiety having a $C_{5-20}$ substituent thus obtained can be used in preparing the catalyst of the present invention in accordance with the procedure described in *Organometallics*, 12, 2140 (1993).

The polymerization of the present invention can be conducted in a conventional manner. For example, a suitable amount of an inert organic solvent and a small amount of cocatalyst are added to a glass reactor. At this stage, if a liquid monomer is to be employed, it is introduced into the reactor together with a suitable solvent. In case of a gaseous monomer, it is charged to the reactor to a preset pressure. Then, a catalyst solution is added thereto e.g., by employing a syringe to initiate the polymerization.

The polymerization may be conducted at a temperature ranging from 0 to 500° C. under a pressure ranging from 0.1 to 500 bar. The cocatalyst may be used in an amount ranging from 1 to 100,000 molar equivalents based on the metallocene catalyst. Specifically, an alkyl metal compound may be used in an amount corresponding to 2 molar equivalents or more based on the catalyst.

The catalyst may be activated by stirring the catalyst and a cocatalyst in a polymerization solvent. A prepolymerization may be conducted prior to initiating the polymerization at a low monomer concentration to control the initial heat of polymerization.

The catalyst of the present invention has an improved solubility in an aliphatic hydrocarbon solvent such as hexane and is easily activated by a cocatalyst. As a result, the catalyst exhibits a high activity in olefinic polymerization and is not deactivated by a long term storage.

The following Examples are intended to illustrate the present invention more specifically, without limiting the scope of the invention.

In the Examples, organic reagents and solvent used in the preparation of the catalysts and polymerization were provided from Aldrich and Merck and then purified in accordance with a standard method. A metallocene catalyst used as a comparative and alkyl aluminum compounds were purchased from Aldrich Co. and used without further purification. High purity gaseous monomers from Applied Gas Technology were passed through moisture and oxygen traps first and then used for the polymerization. Liquid monomers from Aldrich were used after a standard purification. In all steps of catalyst preparation and polymerization, air and moisture were blocked from reaction system in order to increase the reproducibility of the experiments.

The structures of catalyst synthesized were confirmed by using 270 MHz FT-NMR (Jeol Co.). The molecular weight of a polymer was measured with High Temperature Gel Permeation Chromatography (GPC) (150CV, Waters in U.S.A.) and trichlorobenzene as a solvent at a temperature of 140° C.

The melting point of a polymer was measured with differential scanning calorimeter (DSC) by a process comprising the steps of i) elevating the temperature of a sample of 3–4 mg to 180° C. at a speed of 10° C./min.; ii) cooling the sample to the room temperature; iii) elevating the temperature of the sample to 180° C.; then measuring the melting point.

In Examples and Comparative Examples, the polymerization temperature was 80° C. However, it is not intended to limit the scope of the present invention.

EXAMPLE 1

Step 1: Preparation of Catalyst: $(CH_3(CH_2)_7C_5H_4)_2ZrCl_2$

Under a high purity nitrogen atmosphere, 5.8 ml (30 mmol) of 1-bromooctane was introduced into a Schlenck flask and 50 ml of tetrahydrofuran (THF) was added thereto. To the resulting mixture, 18 ml of 2N sodium cyclopentadienide in THF was added at 0° C. The resultant was stirred for 5 hours at room temperature, 100 ml of water and 100 ml of diethyl ether were added thereto, followed by agitation. The diethyl ether layer was dried over anhydrous magnesium sulfate. After filtering magnesium sulfate, the organic solvent was distilled off under a reduced pressure and the residue was subjected to silica gel column chromatography (eluent:hexane) to obtain 4.21 g of n-octylcyclopentadiene (yield: 79%).

Then, 4.21 g (23.6 mmol) of n-octylcylclopentadiene obtained above was transferred to a Schlenck flask and 40 ml of purified THF was added thereto under a high purity argon atmosphere. 9.4 ml of 2.5N n-butyl lithium (n-BuLi) was slowly added thereto at −78° C. The temperature of the resultant mixture was slowly elevated to room temperature and then the mixture was stirred for additional 2 hours to give a ligand solution. 4.45 g of ditetrahydrofuran tetrachlorozirconium $(ZrCl_4(THF)_2)$ was added to a Schlenck flask under a nitrogen atmosphere in a dry box. After removing the flask from the dry box, 80 ml of purified toluene was added to the flask to obtain a slurry, to which the above ligand solution was added using a syringe while preventing air contact. The mixture was stirred for 48 hours at 55° C. and the solvent was evaporated under a reduced pressure. The resulting solid product was recrystallized from a mixture of $CH_2Cl_2$ and hexane to obtain 7.31 g of purified bisoctylcyclopentadiene zirconium dichloride (yield: 60%).

NMR Analysis: 6.29 (4H, t, J=2.43 Hz), 6.20 (4H, t, J=2.43 Hz), 2.62 (4H, t, J=7.83 Hz), 1.7–1.2 (24H, m), 0.88 (6H, t, J=6.4 Hz).

Step 2) Polymerization 200 ml of hexane, 0.2 ml of trimethylaluminum (TMA) and 0.32 ml of methylaluminoxane in toluene (8.5 wt % Al) were added to a 500 ml glass reactor. The reactor was placed in a 80° C. water bath and ethylene gas (40 psig) was introduced thereto for 20 minutes while stirring, and then, the pressure was reduced to an atmospheric pressure. To this solution, a solution of 0.000205 mmol of the metallocene catalyst prepared in step 1 of Example 1 in 0.5 ml of hexane was injected and the ethylene pressure was raised to 40 psig, followed by stirring to initiate the polymerization. During the polymerization, ethylene was introduced continuously to the reactor. After 1 hour, the reaction was quenched and the product was precipitated in 500 ml of 5% HCl/methanol. The resulting precipitates was filtered and dried at 60° C. under a reduced pressure for 24 hours to obtain 11.5 g of white polyethylene.

The weight average molecular weight of the polymer, measured by gel permeation chromatography was 192,000 and the molecular weight distribution was 2.65. The activity of the catalyst was 610 Kg(PE)/g(Zr).h.

EXAMPLES 2 TO 9

The procedure of Example 1 was repeated except that the polymerization condition was varied as shown in Table I to provide catalysts and polymers of the present invention.

The activities of the catalyst are shown in Table I.

EXAMPLE 10

700 ml of purified hexane and 0.5 ml of trimethyl aluminum were added to a 1000 ml glass polymerization reactor (Buchi Reactor) maintained at 80° C., and then, 1.5 ml of MAO was added while stirring. Ethylene monomer was introduced until the internal pressure of the reactor reached 60 psig to saturate the solvent with ethylene. After lowering the ethylene pressure to 1 atmosphere, a solution made by dissolving 0.3 mg of the metallocene catalyst prepared in step 1 of Example 1 in 1 ml of hexane was added thereto while raising the ethylene pressure to 60 psig. After 40 seconds, stirring was start to conduct polymerization for 20 minutes in the same manner as Example 1 to obtain 63 g of the polyolefin.

The activity of the catalyst was 3534 Kg(PE)/g(Zr).h.

EXAMPLES 11 AND 12

The procedure of Example 10 was repeated except that the polymerization condition was varied as shown in Table I to provide catalyst and polymer of the present invention.

The activities of the catalyst are shown in Table I.

EXAMPLE 13

The procedure of Example 11 was repeated except that the catalyst was introduced with stirring to obtain 24 g of polyolefin.

The activity of the catalyst was 1346 Kg(PE)/g(Zr).h.

EXAMPLE 14

After adding 200 ml of hexane into a 500 ml glass reactor, 20 ml of a hexane solution containing 70 wt % norbonene (bicyclo[2.2.1]-2-heptene) and 0.32 ml of methylaluminoxane in toluene were added. The reactor was placed in a 70° C. water bath, ethylene (40 psig) was introduced for 20 minutes while stirring to saturate the solution with ethylene, and then, the pressure was reduced to 1 atm. A solution of 0.004 mmole of the compound prepared in Example 1 in 0.5 ml of hexane was injected into the above reactor, while raising the ethylene pressure to 40 psig, thereby initiating the polymerization. During the polymerization, ethylene was introduced continuously into the reactor. After 90 minutes, the polymerization reaction was quenched by adding 20 ml of ethanol. The product thus obtained was precipitated in 500 ml of 5% HCl/methanol. The precipitates was filtrated and dried for 24 hours at 60° C. under a reduced pressure to obtain 19.5 g of white copolymer.

The activity of the catalyst was 3.23 Kg(copolymer)/g(Zr).h.

EXAMPLE 15

Step 1: Preparation of Catalyst: $(CH_3(CH_2)_{11}C_5H_4)_2ZrCl_2$

The procedure of step 1 of Example 1 was repeated except that 1-bromodocecane was used in place of 1-bromooctane to obtain $(CH_3(CH_2)_{11}C_5H_4)_2ZrCl_2$ (yield: 71%).

NMR Analysis: 6.28 (4H, t, J=2.7 Hz), 6.20 (4H, t, J=2.7 Hz), 2.62 (4H, t, J=7.83 Hz), 1.7–1.1 (44H, m), 0.88 (6H, t, J=6.5 Hz).

Step 2: Polymerization

The procedure of step 2 of Example 2 was repeated except that 0.000158 mmol of the catalyst prepared in step 1 of Example 15 was used ([Al]/{Zr]=5000) to obtain 10.3 g of polyethylene.

The activity of the catalyst was 709 Kg(PE)/g(Zr).h.

EXAMPLE 16

The procedure of Example 12 was repeated except that the catalyst prepared in step 1 of Example 15 was used.

The activity of the catalyst is shown in Table I.

EXAMPLE 17

Step 1: Preparation of Catalyst: $(CH_3(CH_2)_{11}C_5H_4)_2ZrCl_2$

The procedure of step 1 of Example 1 was repeated except that 1-bromodecane was used in place of 1-bromooctane to obtain $(CH_3(CH_2)_{11}C_5H_4)_2ZrCl_2$ (yield: 70%).

NMR Analysis: 6.28 (4H, t, J=2.7 Hz), 6.20 (4H, t, J=2.7 Hz), 2.62 (4H, t, J=7.83 Hz), 1.7–1.1 (32H, m), 0.88 (6H, t, J=6.5 Hz).

Step 2: Polymerization

The procedure of step 2 of Example 1 was repeated except that 0.1 mg of the catalyst prepared in step 1 of Example 17 was used ([Al]/[Zr]=5000) to obtain 16.1 g of the polyolefin.

The activity of the catalyst was 1001 Kg(PE)/g(Zr).h.

EXAMPLE 18

The procedure of Example 12 was repeated except that the catalyst prepared in step 1 of Example 17 was used.

The activity of the catalyst is shown in Table I.

EXAMPLE 19

Step 1: Preparation of Catalyst: $(CH_3(CH_2)_{15}C_5H_4)_2ZrCl_2$

The procedure of step 1 of Example 1 was repeated except that 1-bromohexadecane was used in place of 1-bromooctane to obtain $(CH_3(CH_2)_{15}C_5H_4)_2ZrCl_2$ (yield: 68%).

NMR Analysis: 6.28 (4H, t, J=2.7 Hz), 6.20 (4H, t, J=2.7 Hz), 2.61 (4H, t, J=7.83 Hz), 1.6–1.1 (56H, m), 0.88 (6H, t, J=6.4 Hz).

Step 2: Polymerization

The procedure of Example 1 was repeated except that 0.14 mg of the catalyst prepared in step 1 of Example 19 and 0.25 ml of MAO (8.5 wt % in toluene) were used to obtain 15.3 g of the polymer.

The activity of the catalyst was 879 Kg(PE)/g(Zr).h.

EXAMPLE 20

The procedure of Example 12 was repeated except that the catalyst prepared in Example 19 was used.

The activity of the catalyst is shown in Table I.

EXAMPLE 21

Step 1: Preparation of Catalyst: $(CH_3(CH_2)_5C_5H_4)_2ZrCl_2$

The procedure of step 1 of Example 1 was repeated except that 1-bromohexane was used in place of 1-bromooctane to obtain $(CH_3(CH_2)_5C_5H_4)_2ZrCl_2$ (yield: 76%).

NMR Analysis: 6.27 (4H, t, J=2.7 Hz), 6.20 (4H, t, J=2.7 Hz), 2.61 (4H, t, J=7.83 Hz), 1.6–1.1 (24H, m), 0.88 (6H, t, J=6.4 Hz).

Step 2: Polymerization

The procedure of Example 18 was repeated except that 0.079 mg of the catalyst prepared in step 1 of Example 21 was used to obtain 11.07 g of the polymer.

The activity of the catalyst was 700 Kg(PE)/g(Zr).h.

EXAMPLE 22

The procedure of Example 12 was repeated except that the catalyst prepared in step 1 of Example 21 was used.

The activity of the catalyst is shown in Table I.

EXAMPLE 23

Step 1: Preparation of Catalyst:

$(CH_3(CH_2)_7)(C_5H_4)CHCH_2(C_{13}H_8)ZrCl_2$ i) Preparation of $(CH_3(CH_2)_7)BrCHCH_2Br$ 10.0 g of 1-decene (71.3 mmol) was placed in a flask and 500 ml of diethyl ether was added thereto. 3.67 ml (71.3 mmol) of bromine was added dropwise to the resulting solution at 0° C., and then, stirred for 5 hours at room temperature. The solvent was evaporated under a reduced pressure and the resultant was distilled (104–106° C., 2.0 mmHg) to obtain 37.9 g of pure 1,2-dibromodecane (Yield: 88%).

ii) Preparation of $CH_3(CH_2)_7CHCH_2(C_5H_4)$ 100 ml of 2N sodium cyclopentadienide in THF and 8.8 g of NaH (60%) were introduced into a flask under a high purity argon atmosphere. 30.0 g of 1,2-dibromodecane was added dropwise thereto at 0° C. and the reaction mixture was stirred for 5 hours at room temperature. 300 ml of water and 500 ml of diethyl ether were added to the reaction mixture, agitated, and the organic layer was separated and dried on anhydrous magnesium sulfate. After removing magnesium sulfate by filtration, the solvent was evaporated under a reduced pressure and the residue was distilled (74–76° C., 0.2 mmHg) to obtain 12.3 g of pure spiro (2-octylcyclopropane)-1,1'-cyclopentadiene (Yield: 60%).

iii) Preparation of $(CH_3(CH_2)_7)(C_5H_4)CHCH_2(C_{13}H_9)$ 19.0 g (114 mmol) of fluorene was introduced into a flask under a high purity argon atmosphere and dissolved in 200 ml of THF. 50.2 ml of 2.5 N n-butyl lithium (n-BuLi) in hexane was slowly added thereto at −78° C. The mixture was slowly warmed to room temperature and then stirred for another 2 hours. 11.7 of spiro (2-octylcyclopropane)-1,1'-cyclopentadiene diluted in 200 ml of THF was added dropwise thereto at 0° C., and then stirred for 24 hours at room temperature. 200 ml of water and 500 ml of diethyl ether were added to the reaction mixture, agitated and the organic layer was separated and dried on anhydrous magnesium sulfate. After removing magnesium sulfate by filtration, the solvent was evaporated under a reduced pressure and the residue was subjected to silica gel column chromatography (eluent: hexane) to obtain 8.1 g of pure 1-fluorenyl-2-cyclopentadienyldecane (Yield: 38%).

iv) Preparation of $(CH_3(CH_2)_7)(C_5H_4)CHCH_2(C_{13}H_8)ZrCl_2$ 0.45 g of zirconium tetrachloride ($ZrCl_4$) was introduced into a Schlenck flask under a nitrogen atmosphere in a dry box. After taking the flask out of the dry box, 70 ml of purified dichloromethane was added thereto. The resulting slurry was cooled to −78° C.

0.72 g (1.94 mmol) of 1-fluorenyl-2-cyclopentadienyl decane was introduced into a Schlenck flask under a high purity argon atmosphere and dissolved in 200 ml of THF. 1.55 ml of 2.5 N n-butyl lithium (n-BuLi) in hexane was slowly added thereto at −78° C., warmed slowly to room temperature and then stirred for another 2 hours. The solvent was removed under a reduced pressure and 70 ml of dichoromethane, which was previously cooled to −78° C., was added to the residue at −78° C.

This solution was slowly injected to the above zirconium tetrachloride slurry by employing a syringe while preventing air-contact. The mixture was warmed to room temperature and stirred for 24 hours. The solvent was added under a reduced pressure to give a solid product. 100 ml of hexane was added to the solid product and the mixture was stirred and filtrated through celite to obtain a clear solution. The solvent was evaporated under a reduced pressure to halve the volume of the solution and the resulting solution was allowed to stand in refrigerator to obtain precipitates. The solution was decanted off and the solvent remaining with the precipitates was removed under a reduced pressure to obtain 40.3 mg of spectroscopically pure rac-[1-(9-fluorenyl)-2-cyclopentadienyldecane]zirconium dichloride (Yield: 3.9%).

NMR Analysis: 8.04–7.35 (8H, m), 6.42 (1H, m), 6.13 (1H, m), 6.01 (1H, m), 5.77 (1H, m), 3.98 (1H, m), 3.78 (1H, dd, J=11.4, 14.4 Hz), 3.72 (1H, dd, J=7.8, 14.4 Hz), 1.74–1.25 (14H, m). 1.94–1.75 (2H, m), 1.25 (12H, m), 0.86 (3H, t).

Step 2: Polymerization

The procedure of step 2 of Example 1 was repeated except that 0.00188 mmol of the catalyst prepared in step 1 of Example 23 ([Al]/[Zr]=2400) was used to obtain 5.11 g of the polyethylene.

The activity of the catalyst was 30 Kg(PE)/g(Zr).h.

Comparative Example 1

The procedure of step 2 of Example 1 was repeated except that 0.0003 mmol of biscyclopentadienyl zirconium dichloride (($C_5H_5)_2ZrCl_2$) dissolved in 1 ml of toluene was used ([Al]/[Zr]=5000).

The weight average molecular weight of the polymer was 144,000; molecular weight distribution was 3.47; and the activity of the catalyst was 125 Kg(PE)/g(Zr).h.

Comparative Example 2

The procedure of Example 11 was repeated except that biscyclopentadienyl zirconium dichloride was used to obtain 7.5 g of polyethylene.

The activity of the catalyst was 417 Kg(PE)/g(Zr).h.

Comparative Example 3

The procedure of Comparative Example 2 was repeated except that toluene was used as the polymerization solvent.

The activity of the catalyst is shown in Table II.

Comparative Example 4

The procedure of Example 21 was repeated except that the catalyst prepared in Example 20 was used together with toluene as the polymerization solvent. The product was precipitate in ethanol.

The weight average molecular weight of the polymer was 12,000 and the activity of the catalyst is shown in Table II.

Comparative Example 5

The procedure of Comparative Example 4 was repeated except that the catalyst prepared in step 1 of Example 18 was used.

The weight average molecular weight of the polymer was 11,000 and the activity of the catalyst is shown in Table II.

Comparative Example 6

Step 1: Preparation of Catalyst:

$(C_5H_4)CH_2CH_2(C_{13}H_8)ZrCl_2$

The procedure of Example 23 was repeated except that 1-cyclopentadienyl-2-fluorenylethane was used in place of 1-fluorenyl-2-cyclopentadienyldecane to obtain $(C_5H_4)CH_2CH_2(C_{13}H_8)ZrCl_2$ (Yield: 5.3%).

Step 2: Polymerization

The procedure of step 2 of Example 23 was repeated except that 0.00239 mmol of $(C_5H_4)CH_2CH_2(C_{13}H_8)ZrCl_2$ dissolved in 1 ml of hexane was used to obtain 1.57 g of a polyethylene.

The activity of the catalyst was 7.2 Kg(PE)/g(Zr).h.

TABLE I

| Ex. | (mg) | MAO (ml) | TMA (ml) | Solvent (ml) | Ethylene (psig) | PPT (sec) | PT (min) | Y (g) | AT |
|---|---|---|---|---|---|---|---|---|---|
| 1 | (CH$_3$(CH$_2$)$_7$C$_5$H$_4$)$_2$ZrCl$_2$ (0.1) | 0.32 | 0.2 | Hexane (200) | 40 | 20 | 60 | 11.5 | 645 |
| 2 | (CH$_3$(CH$_2$)$_7$C$_5$H$_4$)$_2$ZrCl$_2$ (0.1) | 0.32 | 0.2 | Hexane (400) | 40 | 20 | 60 | 18.5 | 1038 |
| 3 | (CH$_3$(CH$_2$)$_7$C$_5$H$_4$)$_2$ZrCl$_2$ (0.1) | 0.10 | 0.2 | Hexane (200) | 40 | 20 | 60 | 10.9 | 611 |
| 4 | (CH$_3$(CH$_2$)$_7$C$_5$H$_4$)$_2$ZrCl$_2$ (0.1) | 0.10 | 0.2 | Hexane (400) | 40 | 20 | 60 | 10.8 | 606 |
| 5 | (CH$_3$(CH$_2$)$_7$C$_5$H$_4$)$_2$ZrCl$_2$ (0.1) | 0.60 | 0.2 | Hexane (200) | 40 | 20 | 60 | 12.5 | 701 |
| 6 | (CH$_3$(CH$_2$)$_7$C$_5$H$_4$)$_2$ZrCl$_2$* (0.1) | 0.32 | 0.2 | Hexane (200) | 40 | 20 | 60 | 11.5 | 645 |
| 7 | (CH$_3$(CH$_2$)$_7$C$_5$H$_4$)$_2$ZrCl$_2$** (0.1) | 0.32 | 0.2 | Hexane (200) | 40 | 20 | 60 | 13.7 | 768 |
| 8 | (CH$_3$(CH$_2$)$_7$C$_5$H$_4$)$_2$ZrCl$_2$*** (0.1) | 0.30 | 0.2 | Hexane (400) | 40† | 20 | 60 | 9.4 | 527 |
| 9 | (CH$_3$(CH$_2$)$_7$C$_5$H$_4$)$_2$ZrCl$_2$*** (0.2) | 0.50 | 0.2 | Hexane (400) | 40†† | 20 | 60 | 23.4 | 656 |
| 10 | (CH$_3$(CH$_2$)$_7$C$_5$H$_4$)$_2$ZrCl$_2$ (0.3) | 0.50 | 0.5 | Hexane (700) | 60 | 40 | 40 | 63.0 | 3533 |
| 11 | (CH$_3$(CH$_2$)$_7$C$_5$H$_4$)$_2$ZrCl$_2$ (0.1) | 0.50 | 0.5 | Hexane (700) | 60 | 60 | 60 | 60.0 | 3365 |
| 12 | (CH$_3$(CH$_2$)$_7$C$_5$H$_4$)$_2$ZrCl$_2$ (0.089) | 0.50 | 0.2 | Hexane (700) | 60 | 60 | 60 | 29.0 | 1827 |
| 13 | (CH$_3$(CH$_2$)$_7$C$_5$H$_4$)$_2$ZrCl$_2$ (0.1) | 0.50 | 0.5 | Hexane (700) | 60 | — | 60 | 24.0 | 1346 |
| 14 | (CH$_3$(CH$_2$)$_7$C$_5$H$_4$)$_2$ZrCl$_2$ (4.0) | 0.32 | 0 | Hexane (200) | 40††† | — | 90 | 19.5 | 3.25 |
| 15 | (CH$_3$(CH$_2$)$_{11}$C$_5$H$_4$)$_2$ZrCl$_2$ (0.1) | 0.32 | 0.2 | Hexane (200) | 40 | 20 | 60 | 10.3 | 703 |
| 16 | (CH$_3$(CH$_2$)$_{11}$C$_5$H$_4$)$_2$ZrCl$_2$ (0.104) | 0.50 | 0.2 | Hexane (700) | 60 | 60 | 60 | 33.0 | 2166 |
| 17 | (CH$_3$(CH$_2$)$_9$C$_5$H$_4$)$_2$ZrCl$_2$ (0.1) | 0.32 | 0.2 | Hexane (400) | 40 | 20 | 60 | 16.0 | 1001 |
| 18 | (CH$_3$(CH$_2$)$_9$C$_5$H$_4$)$_2$ZrCl$_2$ (0.099) | 0.50 | 0.2 | Hexane (700) | 60 | 60 | 60 | 26.0 | 1632 |
| 19 | (CH$_3$(CH$_2$)$_{15}$C$_5$H$_4$)$_2$ZrCl$_2$ (0.14) | 0.25 | 0.2 | Hexane (400) | 40 | 20 | 60 | 15.3 | 879 |
| 20 | (CH$_3$(CH$_2$)$_{15}$C$_5$H$_4$)$_2$ZrCl$_2$ (0.128) | 0.50 | 0.2 | Hexane (700) | 60 | 60 | 60 | 30.0 | 1885 |
| 21 | (CH$_3$(CH$_2$)$_5$C$_5$H$_4$)$_2$ZrCl$_2$ (0.079) | 0.25 | 0.2 | Hexane (400) | 40 | 20 | 60 | 11.7 | 741 |
| 22 | (CH$_3$(CH$_2$)$_5$C$_5$H$_4$)$_2$ZrCl$_2$ (0.080) | 0.50 | 0.2 | Hexane (700) | 60 | 60 | 60 | 30.0 | 1875 |
| 23 | (CH$_3$(CH$_2$)$_7$)(C$_5$H$_4$)CHCH$_2$(C$_{13}$H$_8$)ZrCl$_2$ (0.4) | 0.32 | 0.2 | Hexane (200) | 40 | — | 60 | 5.11 | 30 |

Notes:
PPT: Prepolymerization Time (sec);
PT: Polymerization Time (min); Y: Yield (g); and
AT: Activity of the catalyst used (Kg (PE)/g (Zr) · h).
*The catalyst was used after storing for 4 days.
**The catalyst was used after storing for 13 days.
***The catalyst was used after storing for 5 days.
† 3 ml of 1-hexene was used as a comonomer and T$_m$ of the polymer was 116° C.
†† 2 ml of 1-hexene was used as a comonomer and T$_m$ of the polymer was 120° C.
††† 20 ml of norbonene was used as a comonmer.

TABLE II

| Comp. Ex. | Catalyst (mg) | MAO (ml) | TMA (ml) | Solvent (ml) | Ethylene (psig) | PPT (sec) | PT (min) | Y (g) | AT |
|---|---|---|---|---|---|---|---|---|---|
| 1 | (C$_5$H$_4$)$_2$ZrCl$_2$ (0.1) | 0.32 | 0.2 | Hexane (200) | 40 | 20 | 60 | 3.47 | 110 |
| 2 | (C$_5$H$_4$)$_2$ZrCl$_2$ (0.057) | 0.50 | 0.5 | Hexane (700) | 60 | 60 | 60 | 7.5 | 418 |
| 3 | (C$_5$H$_4$)$_2$ZrCl$_2$ (0.050) | 0.50 | 0.5 | Toluene (700) | 60 | 60 | 60 | 52.0 | 3300 |
| 4 | (CH$_3$(CH$_2$)$_5$C$_5$H$_4$)$_2$ZrCl$_2$ (0.080) | 0.50 | 0.2 | Toluene (700) | 60 | 20 | 60 | 19.0 | 1188 |
| 5 | (CH$_3$(CH$_2$)$_{14}$C$_5$H$_4$)$_2$ZrCl$_2$ (0.128) | 0.50 | 0.2 | Toluene (700) | 60 | 60 | 60 | 16.0 | 1005 |
| 6 | (C$_5$H$_4$)CH$_2$CH$_2$(C$_{13}$H$_8$)ZrCl$_2$ (0.4) | 0.32 | 0.2 | Hexane (200) | 40 | — | 60 | 1.57 | 7.2 |

Notes:
PPT: Prepolymerization Time (sec);
PT: Polymerization Time (min); Y: Yield (g); and
AT: Activity of the catalyst used (Kg (PE)/g (Zr) · h).

As shown from the above results, olefinic polymer can be effectively prepared by using a metallocene metal catalyst wherein the ligand is substituted with substituents which increase the solubility of the catalyst in an aliphatic hydrocarbon solvent.

While the embodiments of the subject invention have been described and illustrated, it is obvious that various changes and modifications can be made therein without departing from the spirit of the present invention which should be limited only by the scope of the appended claims.

What is claimed is:

1. An improved process of preparing an olefinic polymer of the type in which an olefinic monomer is polymerized alone or with a comonomer in a hydrocarbon solvent using a metallocene catalyst of formula (I) in the presence of a cocatalyst; wherein the improvement comprises: preparing the olefinic polymer in an aliphatic hydrocarbon solvent selected from the group consisting of pentane, hexane and heptane, using a modified metallocene catalyst which is obtained by introducing at least one linear C$_{5-20}$ alkyl substituent into the alkylene bridge of the metallocene catalyst of formula (I):

$$L^1L^2MX_2 \tag{I}$$

wherein,

M is Ti, Zr or Hf;

X is a halogen or a C$_{1-3}$ alkyl group; and

L¹ and L² are each a π-ligand selected from the group consisting of cyclopentadienyl, indenyl, fluorenyl and derivatives thereof, and are linked together by a $C_{1-4}$ alkylene bridge optionally further substituted with a $C_{1-3}$ hydrocarbyl group.

2. The process of claim 1 wherein the monomer or the comonomer is selected from the group consisting of ethylene, α-olefins, cyclic olefins, -dienes, trienes, styrenic monomers and a mixture thereof.

3. The process of claim 1 wherein the cocatalyst is an alkylaluminoxane of formula (XI), an alkyl metal compound of formula (XII), or a mixture thereof;

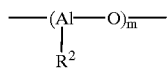

(XI)

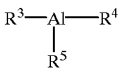

(XII)

wherein:

m is an integer of 2 or more; and $R^2$, $R^3$, $R^4$ and $R^5$, are each $C_{1-20}$ hydrocarbyl group or a halogen.

* * * * *